Aug. 14, 1945.  P. J. LEAVER ET AL  2,381,913
PROPELLER HOIST
Filed July 10, 1944  2 Sheets-Sheet 1

INVENTORS
PAUL J. LEAVER
PHILLIP W. MATTHEWS
BY
ATTORNEYS

Aug. 14, 1945. P. J. LEAVER ET AL 2,381,913
PROPELLER HOIST
Filed July 10, 1944 2 Sheets-Sheet 2

INVENTORS
PAUL J. LEAVER
PHILLIP W. MATTHEWS
BY
ATTORNEYS

Patented Aug. 14, 1945

2,381,913

UNITED STATES PATENT OFFICE 2,381,913

PROPELLER HOIST

Paul J. Leaver, Lowell, Mass., and Phillip W. Matthews, Fontana, Calif.

Application July 10, 1944, Serial No. 544,302

2 Claims. (Cl. 212—13)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to hoists and specifically to a hoist for installing or removing the propeller of an aircraft engine.

An object of the invention is to provide a device of this kind which is of light weight and of simple construction and of such small dimensions that it may conveniently be used by mobile depots in servicing aircraft in the field where heavy hoisting equipment is not available.

Another object is to provide a device of this character which may be attached in minimum time to the engine of the aircraft with least disturbance of the engine itself.

Figure 1:
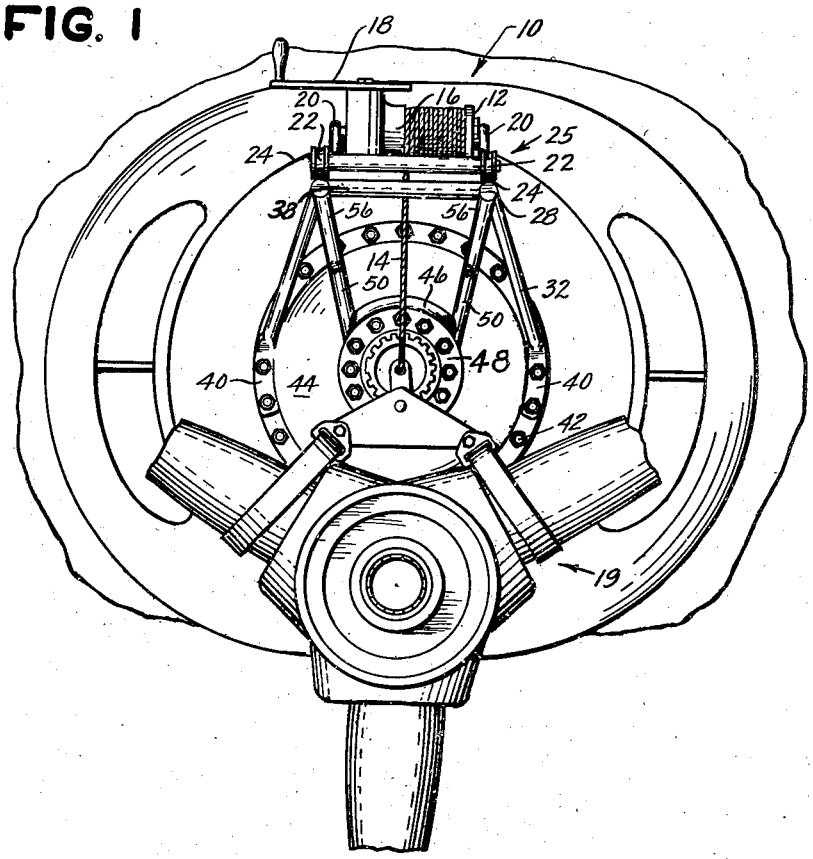

Other objects and advantages will become evident as the invention is described with reference to the drawings, wherein, Fig. 1 is a front view of a device which embodies our invention.

Figure 2:
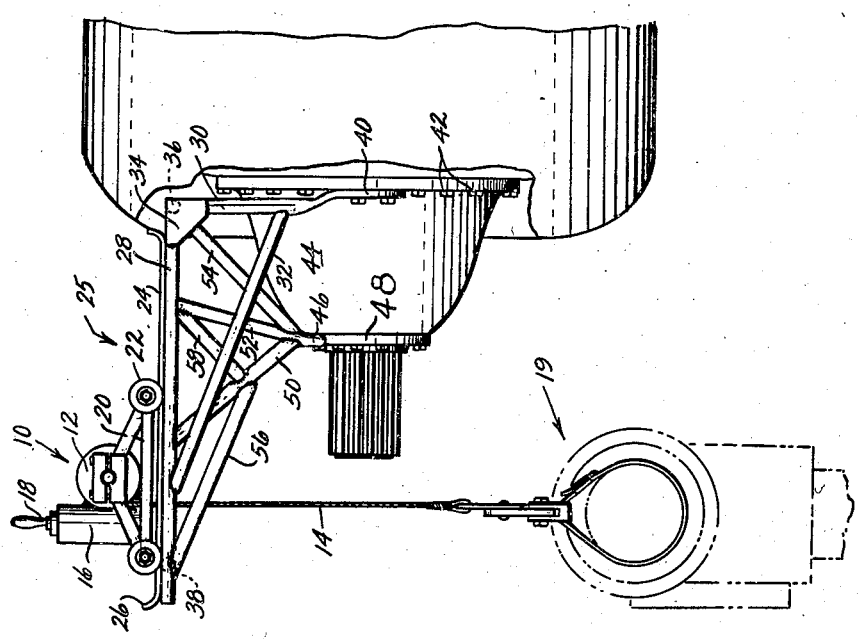

Fig. 2 is a side view of the device shown in Fig. 1.

Like reference characters refer to like parts throughout the drawings.

Referring to the drawings, the hoist 10 is of substantially standard construction, comprising a drum 12 upon which the cable 14 is wound by worm and wheel gearing within the housing 16 operable by a crank 18. A substantially standard bomb sling 19 is carried on the free end of the cable. The carriage 20 is provided with grooved wheels 22 whereby the hoist is movable back and forth on runways 24 in the conventional manner, the ends of the runways being turned up as at 26 to limit the travel of the wheels.

The runways 24 are cantilever supported and an important feature of the invention resides in the unique construction of the supporting structure which permits the runways to be located well above the propeller shaft while the fastening means is substantially in the same horizontal plane as the shaft.

The cantilever supporting structure 25 is formed mainly of welded together sections of steel tubing and comprises, on each side, a horizontal tubular member 28 having the inner end attached to the top of a substantially vertical member 30, and a diagonal brace 32 joined at the ends to the two members. A gusset 34 strengthens the joint between the inner end of the horizontal member and the top end of the vertical member. Two transverse members 36 and 38 join the two sides of the supporting structure to maintain their spaced apart relation. A mounting bracket 40, formed where the inner end of the brace 32 joins the lower end of the vertical member 30, is provided with mounting stud holes which constitute a means of attachment of the runway supporting structure to the engine. The nuts are removed from two of the studs 42 which fasten the engine nose 44 to the power section. The holes in the mounting bracket are placed over the studs and the nuts returned to the studs and tightened.

An arcuate yoke 46 is fitted to the periphery of the propeller thrust bearing plate 48 at the top. Each end of the yoke 46 supports three braces 50, 52 and 54. The lower ends of the braces are fastened to the yoke, the braces extending upward to spaced apart points on the horizontal members 28 to which they are welded or similarly fastened. Additional braces 56 and 58 extend from points midway of the braces 50 to the horizontal runway supporting member 28. The following instructions for the operation of the device should be followed.

Remove nuts from two nose-to-power-section studs on each side of engine nose. Mount supporting structure 25 on studs and fasten with nuts, the arcuate yoke 46 resting on the periphery of the propeller thrust bearing plate 48 as shown. Place hoist on runways. Put sling around propeller blades and take up slack in cable.

Prepare propeller for removal from shaft. Turn handle on hoist clockwise, tightening cable and taking weight of propeller from shaft. Roll carriage to full forward position at which the turned up ends 26 arrest further forward movement. The propeller will now clear the forward end of the shaft. Turn crank counterclockwise to lower propeller to the floor. This is the preferred procedure for removing the propeller. Reversing the steps above outlined constitute the proper procedure for installing.

Having thus described our invention, we claim:

1. In a device for installing and removing a propeller from the propeller shaft of an aircraft engine of the type having a bowl-shaped nose member with the rim secured to the power section by a circular row of studs and nuts, and a propeller thrust bearing plate secured to the small end of the bowl, a hoist, a carriage for said hoist, runways for said carriage parallel to the axis of said shaft and above said shaft, a cantilever supporting structure for said runways which comprises a pair of horizontal parallel rails for supporting said runways, a pair of mounting brackets adapted to be secured to the rim of the bowl by the studs and nuts which are on opposite sides of, and substantially in the horizontal plane of the propeller shaft, an arcuate yoke fitted to the upper side of the periphery of the propeller thrust bearing plate, and a plurality of upwardly diverging braces extending from the brackets and from the ends of the yoke to spaced apart positions on the supporting rails.

2. In a device for installing and removing a propeller from the propeller shaft of an aircraft engine of the type having a bowl-like nose member with the rim of the bowl secured to the power section by a plurality of fastening means, and a ledge forward of said rim on the small end of the bowl, a hoist, a carriage for said hoist, parallel runways for said carriage parallel to the axis of said shaft, and above said shaft, a cantilever supporting structure for said runways which comprises a pair of horizontal parallel rails, a pair of brackets at the inner ends of said rails adapted to be secured to the part of the engine by a selected number of said fastening means, a yoke adapted to rest on said ledge, and a plurality of upwardly diverging braces, some extending from the brackets and others from the yoke, to spaced apart positions on the rails.

PAUL J. LEAVER.
PHILLIP W. MATTHEWS.